Nov. 17, 1936.    L. E. LA BRIE    2,060,875
BRAKE
Original Filed Feb. 27, 1925    2 Sheets-Sheet 1

INVENTOR.
LUDGER E. LA BRIE
BY Jerome R. Cox
ATTORNEY.

Nov. 17, 1936.  L. E. LA BRIE  2,060,875

BRAKE

Original Filed Feb. 27, 1925  2 Sheets-Sheet 2

INVENTOR.
LUDGER E. LA BRIE
BY Jerome R. Cox
ATTORNEY.

Patented Nov. 17, 1936

2,060,875

UNITED STATES PATENT OFFICE

2,060,875
BRAKE

Ludger E. La Brie, South Bend, Ind., assignor to Bendix Aviation Corporation, South Bend, Ind., a corporation of Delaware Original application February 27, 1925, Serial No. 11,936. Patent No. 1,913,932, dated June 13, 1933. Divided and this application July 15, 1932, Serial No. 622,785

14 Claims. (Cl. 188—78)

This invention relates to vehicle brakes, and particularly to brakes of the type wherein the braking action is had between a plurality of articulated shoes and an encompassing drum.

One object of the invention is to provide an improved brake wherein a servo braking action may be had in connection with either forward or reverse rotation of the associated wheel.

Another object is to provide a brake wherein articulation between the shoes is effected through the flexing of leaf springs secured to the adjoining ends of the shoes.

A further object is to provide a brake wherein the shoes are flexible to the extent of bending if necessary into contact throughout their lengths with the inner face of the drum under brake-actuating forces applied to the ends of the shoes tangentially of the drum.

Still another object is to provide a brake which is of light durable and inexpensive construction, simple arrangement, and efficient operation.

Other objects and advantages will be evident upon an understanding of the invention as had from the illustrative embodiment of the same presented in the accompanying drawings and in the following detailed description based thereon. The invention is susceptible, however, of embodiment in various other structurally modified forms which come equally within the spirit of the invention as defined by the appended claims.

Figure 1:
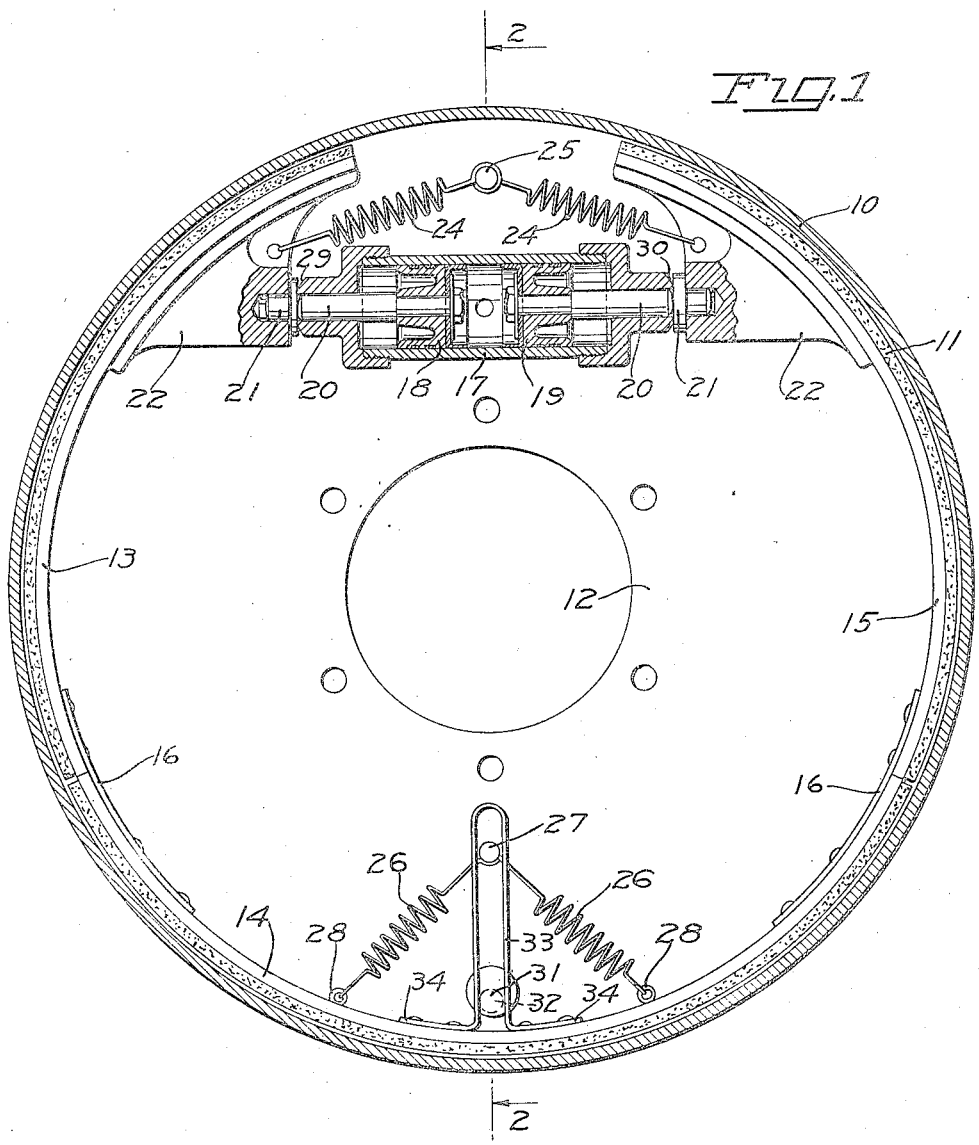
Figure 1 is an interior view of the brake, taken on the line 1—1 of Figure 2, and showing the brake in its non-applied position.
Figure 2:
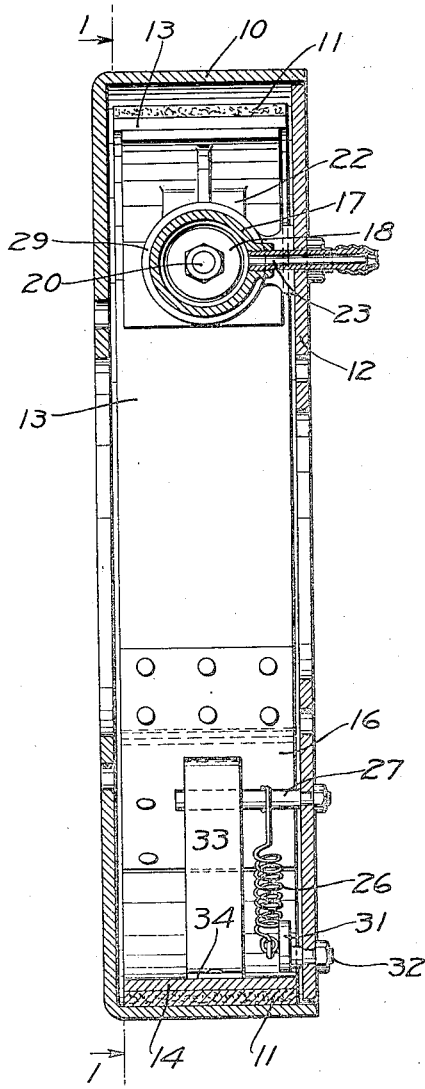
Figure 2 is a diametric section taken on the line 2—2 of Figure 1.

The brake includes a drum 10, and a plurality of articulated shoes 11 for engagement with the inner face of the drum upon the application of the brake. The drum 10 is fixedly secured to a vehicle wheel or other rotatable element to be braked, and the shoes 11 are associated with an anchor plate 12 or other non-rotatable mounting in a novel manner hereinafter described.

In this particular embodiment of the invention, three shoes 13, 14, and 15 are employed, and the articulations between the abutting ends of the shoes are effected by the use of leaf springs 16 which are secured contiguously to the backs of the shoes by rivets or other suitable means; but it will be obvious that, in arriving at certain of the advantages of the brake, a greater or less number of shoes may be employed, and other forms of articulations may be used. Shoes 13, 14, and 15 may be regarded as segments or sections of a substantially continuous friction band which is expansible as a whole, although the several segments may be, if desired, substantially rigid or many be partially flexible.

A fluid cylinder 17 is secured to the upper portion of the anchor plate 12 at a point between the free ends of the two end shoes 13 and 15, and is provided with two oppositely reciprocating pistons 18 and 19 having stems 20 which are adapted to move against thrust plates 21 carried by brackets 22 secured to the end shoes 13 and 15 adjacent the free ends of the same. The cylinder 17 is also provided with an inlet 23 through which any suitable fluid under pressure may be fed into the cylinder to effect a separative movement between the pistons 18 and 19 whereby to expand the shoes into frictional engagement with the drum.

When the brake is in its released position, the three shoes are contracted relative to each other by means of a pair of upper shoe-contracting springs 24 which extend between a pin 25 projecting from the upper portion of the anchor plate 12 and the two brackets 22 secured to the end shoes 13 and 15, and are held up out of engagement with the bottom of the drum by means of a pair of lower shoe-supporting springs 26 extending between a pin 27 projecting from the lower portion of the anchor plate 12 and two attaching eyes 28 secured to the intermediate shoe 14 at points equidistant from the center of the same.

The extent to which the shoes are contracted and elevated by the springs 24 and 26 is limited by contact of the thrust plates 21 on the end shoes 12 and 15 with the ends 29 and 30 of the cylinder 17, and by contact of the back of the intermediate shoe 14 with the lower surface of a disc 31 which is eccentrically mounted for the purpose of adjustment on an exteriorly accessible stem 32 in an aperture in the lower portion of the anchor plate.

It will be evident from the foregoing description that, if the brake is applied when the drum 10 is stationary, the pistons 18 and 19 will force the end shoes 13 and 15 and the intermediate shoe 14 into frictional engagement with the drum. If the brake is applied however when the drum 10 is rotating in the direction indicated in Figure 3, the end shoe 13 will move circumferentially of the drum as soon as it is forced into frictional engagement with the same by the piston 18, the intermediate shoe 14 will be forced by the end shoe 13 into frictional engagement with the drum, and the end shoe 15 will in turn be forced by the preceding shoes 13 and 14 into frictional engagement with the drum. The circumferential movement of the shoes caused by the rotation of the drum is limited by contact of the thrust plate 21 with the end 30 of the cylinder 17, as the piston 19 will yield and move back in the cylinder under the pressure exerted thereon by the shoes in their circumferential movement. Very little pressure is required for the application of the brake when the drum is rotating in the direction indicated in Figure 3, as the friction initially engendered between the shoe 13 and the drum serves to force the following shoes 14 and 15 into frictional engagement with the drum. When the drum is rotating in the opposite direction, this servo or self-energizing braking action of the shoes relative to the drum may be had, the end shoe 15 then serving as the means for forcing the following shoes 14 and 13 into frictional engagement with the drum.

Figure 3:
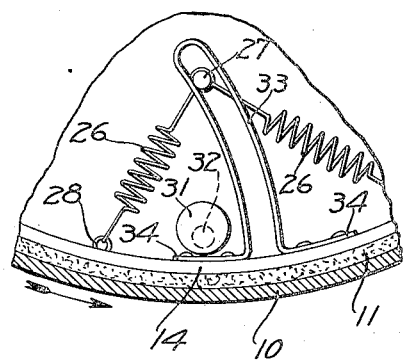
Figure 3 is a fragmentary view corresponding to a portion of Figure 1 showing the brake positioning means when the brake is applied while the vehicle is moving forward.

The means for returning all of the shoes in either direction circumferentially of the drum to their normal positions after the brake has been released, consists of a U-shaped spring 33 having oppositely bent end portions 34 which are secured by rivets or other suitable means to the back of the intermediate shoe 14. The pin 27, which was previously described as the mounting for the springs 26, extends through the slot formed between the spaced sides of the spring 33. When the shoes are caused to move circumferentially with the drum a limited distance in accomplishing the servo braking action, the spring 33 is resiliently flexed by the pin 27 as shown in Figure 3, and, when the brake is released and the springs 24 and 26 draw the shoes out of engagement with the drum, the stress in the spring 33 occasioned by the flexing of the same serves to oscillate the shoes as a unit back to their normal positions, as shown in Figure 1.

It will be observed that the ends 29 and 30 of the cylinder 17, which serve to stop circumferential movement of the end shoe coming into contact therewith, form acute angles with the adjacent portions of the drum, and thereby afford a wedging action on the shoes which augments the servo action described.

This application is a division of my copending application Serial Number 11,936 filed February 27th, 1925. It is based on an identical disclosure with the disclosure of said copending application. Both applications disclose a brake including a friction device, a return means for said friction device, and applying and anchoring means therefor. Generally speaking, the parent application is directed toward the applying and anchoring means while this application is directed toward the return means and the friction means. The claims of said copending parent application Serial 11,936 are directed toward the applying means per se and the anchoring means per se, and toward the combination of the applying means and/or anchoring means with each other, with other elements of the brake, or with other features thereof, except the combination of the applying means and/or anchoring means with the return means. All other features and combinations are claimed in this application. The claims of this application are directed therefore toward the return means per se, the friction means per se, and all combinations of elements and features of the brake excepting combinations of the applying means and/or anchoring means with other elements than the return means.

I claim:

1. In a brake, a drum carried by a rotatable element to be braked, a plurality of connected flat and partially flexible segments carried by a non-rotatable mounting and shiftable bodily relative thereto into engagement with the drum, means tending to hold the segments contracted and out of engagement with the drum in their normal positions, means for moving either one of the end segments into engagement with the drum to cause all of the segments to move circumferentially of the drum and into engagement with the same in the direction in which the drum is rotating, means for anchoring the outer of the end segments against movement circumferentially of the drum, and means tending to return all of the segments in either direction circumferentially of the drum, to their normal positions.

2. In the brake, a drum carried by a rotatable element to be braked, a plurality of articulated shoes carried by a non-rotatable mounting and shiftable bodily relative thereto into engagement with the drum, coil springs connecting the shoes to the non-rotatable mounting and tending to hold the shoes contracted and out of engagement with the drum in their normal positions, an applying mechanism mounted on the non-rotatable mounting between the end shoes to act against the end shoes for moving either one of the same into engagement with the drum to cause all of the shoes to move circumferentially of the drum and into engagement with the same in the direction in which the drum is rotating, means for limiting the movement of the shoes circumferentially of the drum, a leaf spring carried by the shoes, and a member carried by the non-rotatable mounting and coacting with the leaf spring to return all of the shoes in either direction circumferentially of the drum to their normal positions.

3. In a brake, a drum carried by a rotatable element to be braked, a plurality of articulated shoes carried by a non-rotatable mounting and shiftable bodily relative thereto into engagement with the drum, means for moving either one of the end shoes into engagement with the drum to cause all of the shoes to move circumferentially of the drum and into engagement with the same in the direction in which the drum is rotating, means for limiting the movement of all of the shoes circumferentially of the drum, a leaf spring secured to and projecting radially from the shoes, and a loose connection between the spring and the non-rotatable mounting at a point spaced from the shoes for causing the spring to flex resiliently upon movement of the shoes circumferentially of the drum in either direction.

4. A brake comprising, in combination, a drum, a central shoe and an end shoe connected to each end of the central shoe, the three shoes being arranged within the drum and extending substantially the entire circumference, and means for forcing the end shoes apart against the drum, the central shoe being forced against the drum by circumferential movement of one of the end shoes, together with means acting yieldingly on the central shoe to center all three shoes when the brake is released.

5. A brake comprising, in combination, a drum, a central shoe and an end shoe connected to each end of the central shoe, the three shoes being arranged within the drum and extending substantially the entire circumference, means for forcing either end shoe against the drum, and means for taking torque from the other end shoe, the central shoe being forced against the drum by circumferential movement of one of the end shoes, together with means acting yieldingly on the central shoe to center all three shoes when the brake is released.

6. A brake comprising, in combination, a drum, a floating friction device within the drum shiftable in one direction or the other according to the direction of rotation of the drum, and centering means for said device including a U-shaped doubled leaf spring and a pin embraced by the spring and flexing the spring when the device shifts in either direction.

7. A brake comprising, in combination, a rotatable drum and a stationary support, a friction device within the drum, an elongated doubled leaf spring secured at its ends to the friction device, and a part carried by the support and slidably embraced by the doubled spring.

8. A brake having friction means and a fixed part and provided with return springs including a leaf type spring engaging the fixed part at one end and engaging the friction means at its other end, in combination with a pair of coil springs diverging from said body and secured to the friction means.

9. A brake having return springs including a radially arranged leaf type spring in combination with a pair of coil springs diverging from the inner end of the said leaf type spring.

10. In brake mechanism of the type described, a construction including a hollow drum, a circular split band, means for separating the ends of the band, a flexible projection at the middle of the band, and fixed means cooperating with the flexible portion to restrain its movement in either direction substantially as and for the purposes set forth.

11. A brake comprising in combination, a drum, a floating friction device within the drum having shiftable ends and shifting to anchor at the top of said drum at one of said ends when the drum is turning in one direction and also at the top of said drum at the other end when the drum is turning in the other direction, a spring secured to said friction device and operatively associated with said drum arranged at the bottom of said drum opposite to said ends, which is flexed crosswise by the shifting of the said friction device, and which urges said device back toward its idle position, and means separate from said spring for supporting said friction device in said drum.

12. In a brake, a drum carried by a rotatable element to be braked, a series of connected flat and partially flexible segments carried by a nonrotatable mounting and shiftable bodily relative thereto into engagement with the drum, a plurality of springs connecting said segments, means tending to hold the segments contracted and out of engagement with the drum in their normal positions, means for moving either one of the end segments into engagement with the drum to cause all of the segments to move circumferentially of the drum and into engagement with the same in the direction in which the drum is rotating, means for anchoring the outer of the end segments against movement circumferentially of the drum, and means tending to return all of the segments in either direction circumferentially of the drum to their normal positions.

13. In a brake, a drum, a series of curved shoes arranged in end to end relation for engagement with the inner face of the drum and a plurality of flat springs connecting said shoes, each of said shoes being a flat metallic strip which has sufficient flexibility to bend into uniform engagement with the inner face of the drum under pressure applied to an end of the shoe tangentially of the inner face of the drum but which has less flexibility than the connecting springs.

14. A brake comprising, in combination, a drum, a floating friction device within the drum shiftable in one direction or the other according to the direction of rotation of the drum, applying means for said device, and a centering means for said device including a leaf spring opposite to said means and flexed by shifting of the device in either direction and an abutment with which said spring contacts and along which said spring slides in accommodating itself to the movement of the friction device.

LUDGER E. LA BRIE.